United States Patent [19]

Hencke et al.

[11] 3,838,524

[45] Oct. 1, 1974

[54] PACKING OF PARTICULATE BEDS

[75] Inventors: William R. Hencke, Wappingers Falls; Li C. Mih, Beacon; Richard V. Kessler, Fayetteville, all of N.Y.

[73] Assignee: Texaco Inc., New York, N.Y.

[22] Filed: Mar. 19, 1973

[21] Appl. No.: 342,669

[52] U.S. Cl.............. 34/10, 423/659, 23/288 A, 23/288 G, 134/25 R
[51] Int. Cl.............................................. F26b 3/08
[58] Field of Search.............. 34/9, 10, 57 A, 57 R; 23/288 R, 288 A, 288 G, 288 S; 264/176, 178; 134/25 R, 7; 164/39; 423/659

[56] References Cited
UNITED STATES PATENTS

| | | | |
|---|---|---|---|
| 2,635,949 | 4/1953 | Fenske et al. | 23/288 S |
| 2,742,408 | 4/1956 | LaPorte | 423/659 |
| 2,813,351 | 11/1957 | Godel | 23/288 S |
| 3,093,450 | 6/1963 | Luerssen et al. | 423/659 |
| 3,285,592 | 11/1966 | Keizo Ueda et al. | 34/9 |
| 3,374,052 | 3/1968 | Fan et al. | 134/25 R |
| 3,384,972 | 5/1968 | Oxley | 34/9 |
| 3,650,037 | 3/1972 | Oetiker | 34/10 |
| 3,677,716 | 7/1972 | Weber et al. | 23/288 S |

FOREIGN PATENTS OR APPLICATIONS

| | | | |
|---|---|---|---|
| 541,483 | 5/1957 | Canada | 34/9 |

*Primary Examiner*—John J. Camby
*Assistant Examiner*—Henry C. Yuen
*Attorney, Agent, or Firm*—T. H. Whaley; C. G. Ries

[57] ABSTRACT

Low density gravity-packed beds of particles may be compacted to yield higher density beds.

15 Claims, No Drawings

PACKING OF PARTICULATE BEDS

BACKGROUND OF THE INVENTION

This invention relates to a novel bed of particles. More particularly, it relates to a novel method of compacting a catalyst bed.

As is well known to those skilled in the art, many processes are carried out by passing the reactants, either in liquid phase or in gas phase, through a bed of particles. Typical of such processes may be various vapor-liquid contacting operations such as humidification, drying, heating, cooling, etc. In many cases, the particles may be catalyst particles typically including active materials on an inactive (or active) support. Typical of the processes which may be carried out by passage of fluids through such beds of catalysts may include various catalytic operations typified by reforming, polymerization, hydrodesulfurization, oxidation, disproportionation, hydroalkylation, etc.

In such operations, the catalyst may typically be present in the form of prismatic, cylindrical, or round pellets, having a greatest dimension commonly 1–50, preferably 1–20, say about 4.5 mm. A typical pellet may be a cylinder about 1.5 mm in diameter and about 4.5 mm in length. Such catalyst particles may be formed by molding, stamping, or more commonly by extruding.

During processing, the fluid may be passed through the bed to effect the desired result. Most efficient operation, with maximum control of reaction and heat transfer, requires that the fluid uniformly pass through the bed i.e. that the fluid flow into and through the bed be uniform. This requires that the bed be uniformly packed i.e. that through any given cross-section the bed should possess a uniform density. This is achieved by maintaining the bed at uniform maximum density.

It is necessary to maintain the catalyst bed at uniform density to attain uniform flow patterns throughout the bed during processing.

It is also necessary to maintain the catalyst bed at maximum density to attain maximum contact in minimum volume. Undesirable free space in a reaction vessel permits shifting of the catalyst bed into undesirable configurations. It also decreases the reactor efficiency in terms of catalytic activity per cubic meter of reactor volume.

It is an object of this invention to provide a novel method of compacting a bed of particles. It is another object of this invention to provide a novel method of loading a container with a bed of particulate catalyst. Other objects will be apparent to those skilled in the art.

STATEMENT OF THE INVENTION

In accordance with certain of its aspects, the novel process of this invention for compacting or densifying a charge low density gravity-packed bed of particles may comprise submerging said charge low density gravity-packed bed of particles in a body of liquid; and pulsating said submerged charge low density gravity-packed bed of particles with a gas during a pulsation period thereby compacting said charge low density gravity-packed bed and forming a compacted gravity-packed bed of density greater than the density of said charge bed.

DESCRIPTION OF THE INVENTION

The particles which may be treated by the process of this invention may include particles of various configuration — typified by spherical, cylindrical, or other regularly shaped particles produced by molding, casting or extruding — or particles of irregular configuration such as randomly shaped pieces of stone, coke, clay, etc. The particles may be active or inert; and in the preferred embodiment, they may be particles of catalyst which includes a support such as silica-alumina, alumina, zeolite, bearing an active component e.g., a Group VIII metal such as platinum or rhodium.

Although the process of this invention may be employed in connection with particles of any desired size, commonly the particles may have a greatest dimension of 1–50 mm, preferably 1–20 mm, say 4.5 mm. In a typical embodiment, the particles may be silica-alumina cylinders (of 1.5 mm diameter and 4.5 mm height) bearing a sulfided Group VIII metal, preferably nickel.

In practice of the process of this invention, the particles of catalyst may be admitted to a container, typically a vertically-extending vessel bearing a catalyst supporting grid in a lower portion thereof. Preferably, the container will contain, during the loading operation, a body of liquid through which the particles pass to a rest position in which the particles are supported primarily by the catalyst supporting grid.

The preferred liquid may be one which is substantially inert under the conditions prevailing during loading. Typical of such liquids may be kerosene, gas oil, naphtha, etc. In the preferred embodiment, the liquid may be the same liquid as that which is to be passed through the catalyst bed during operation.

The liquid will preferably be maintained in the container or reaction vessel under substantially quiescent conditions; and in the preferred embodiment, it will preferably be maintained at a level such that at all times during filling, the catalyst mass will be submerged. More preferably however, it will be maintained at a level which will be sufficient to more than submerge the catalyst bed when the entire bed is in place. It may be desirable to initiate operations with a liquid height which is at least equal to the height of the particulate bed when the latter is in place in uncompacted form. Clearly as the catalyst is added to the vessel, the liquid is displaced and the liquid level may rise to 10%–75%, said 30% above the initial level — excess of liquid may be drained by overflow conduits at appropriate levels in the vessel.

In practice of the process of this invention in the preferred embodiment, the particles may be passed downwardly through the body of liquid to a rest position in the container. The particles will be added to the liquid in controlled deliberate free-flow-preferably at a rate of 0.0005 – 0.01 volumes of catalyst per minute per initial volume of liquid, typically 0.001 – 0.005, say 0.002. Addition of particles will thus form a low density-gravity packed bed of particles.

The bulk density of this low density gravity-packed bed of particles (expressed in terms of liquid-free dry particles) may typically be 20–100, commonly 30–50, say 39 pounds per cubic foot. The bulk density depends on the material making up the particles, the average size, the size distribution, the true density, and other factors. Although it may be possible to achieve the advantages of the process of this invention to a limited degree by submerging less than the entire bed in the body of liquid, the preferred embodiment is that wherein the charge bed is at least completely submerged in the body of liquid. Typically the height or depth of the liquid may be 100%–150% of the height of the charge bed, preferably 105%–115%, say 110% of the height of the charge bed.

The body of liquid will preferably be a body of inert liquid i.e. liquid which does not undesirably react with the particles. It may be a hydrocarbon liquid e.g. kerosene, naphtha, gas oil etc. In the preferred embodiment, it may be the same liquid as that which is contacted with the particles during use of the bed.

It is a feature of the process of this invention that the body of liquid be preferably static during the practice of the invention i.e. the total volume of liquid may remain essentially constant and commonly little or no liquid may be added or removed during practice of the process. It will be apparent to those skilled in the art that the liquid, although considered in this respect to be static, will not be quiescent i.e. unmoving during densification or compacting of the bed.

Densification or compacting in accordance with the process of this invention may be effected by passing gas upwardly through the charge low density gravity-packed bed of particles at an initial velocity greater than the expansion velocity of the bed thereby forming an expanded bed during a first portion of a compacting cycle. Preferably the upward flow of gas through the bed may be 1%–5%, commonly 1%–10%, say 5% greater than the expansion velocity.

The expansion velocity of the particles of the bed, as the term is used in this specification, is defined as the velocity of an upflowing stream of gas which will expand a contained bed (in the presence of the liquid) sufficient to minimize contact between individual particles in the bed. The upward force of the velocity head of the flowing gas may typically balance the downward force derived from the force of gravity acting on the mass of particles. It will be apparent to those skilled in the art that the expansion velocity may vary depending on the properties of the particle and of the fluid in which it is immersed including size, density, mass, porosity, configuration, surface area etc. of the particle and the density, viscosity, temperature, and chemical composition of the fluid — as well as the frictional forces between the particles and the fluid.

For a typical bed containing catalyst particles (for example of cylindrical shape), having a diameter of about 1.5 mm. and a height of about 4.5 mm., the expansion velocity in a gas such as nitrogen at 25° C. (in the presence of liquid) may be 30 cm/sec. Typically the initial upward velocity may be 1–100, preferably 10–40, say 35 cm/sec.

Passage of gas upwardly through the bed may slightly lift the particles and reduce the frictional forces between particles. Typically the bulk density may be substantially unchanged as gas is passed upwardly through the bed. The typical bulk density of the expanded bed may be 95%–99% of the low density prevailing in the charge gravity-packed bed. The particles may be moved-apart during upward flow of the gas to a distance of 1.01–3, preferably 1.1–2, say 1.5 diameters (center-to-center distance).

The upward gas velocity may, depending upon the density and size of the particles, preferably be 1–100, more preferably 50–100, typically 70–90, say 80 feet per minute.

The upward velocity of the gas passing through the bed will preferably be maintained at a point less than that which is sufficient to destroy the integrity of the bed. This preferred maximum velocity may be less than that at which the bed becomes fluidized i.e. at which there is substantial homogeneity between all portions of the bed and the individual particles move at random throughout the entire bed. Below the preferred maximum, the bed maintains its integrity to a substantial degree. Individual particles may appear to be vibrating about a more-or less fixed point and each particle has substantially no translational motion (i.e. other than that implicit in the vibrational mode).

The bed as a whole may appear to vibrate or jiggle. There may normally be little or no disengagement of individual particles from the upper surface of the bed; and the bed as a whole will become substantially uniform and free of void or non-uniform spaces.

Each particle in the expanded bed may be separated from adjoining particles by a space and the contact and frictional forces between individual particles or between particles and the wall of the container may be reduced to a minimum.

The expanded bed may be maintained in the first portion of the compacting cycle for about 0.1–10, preferably 0.5–1, say 0.6 seconds.

At the end of this period of time, the velocity of the upwardly flowing gas may be decreased to a velocity less than the expansion velocity of the particles of said bed; and this lower velocity may prevail during a second portion of a compacting cycle. The velocity in this second portion may be 0%–99%, preferably 90%–99%, say about 95% of the velocity in the first cycle. During this second portion which may occupy 0.1–10, preferably 0.5–1, say 0.6 seconds, the bed of particles will become more dense than the initial low density gravity packed bed.

It is however a feature of the process of this invention that the compacting cycle be repeated 10–100, preferably 40–60, say about 50 times to effect desired degrees of compaction.

It is also a particular feature of the process of this invention that the upward velocity of the gas be decreased in cycles subsequent to the first. In the case of the first portion of each of the compacting cycles, the upward velocity may be less than that in the corresponding part of the cycle immediately preceding by 1%–10%, preferably 2%–5%, say 2.5%; and after a typical sequence of about 20 cycles, the final upward velocity during this portion of the cycle may be about 30%–60%, preferably 35%–50%, say 37% of the initial upward velocity of the first compacting cycle.

In the case of the second portion of the compacting cycle, the upward velocity in each cycle may be less than that in the corresponding part of the cycle immediately preceding by 1%–20%, preferably 2%–5%, say about 2.5%. Alternatively expressed the velocity may decrease in each cycle by an amount (in terms of e.g. feet per minute) of 3%–30%, typically 5% of the initial velocity.

In a typical cycle, occupying a total time of 100 seconds (wherein the liquid is kerosene and the upwardly flowing gas is nitrogen), the upward velocity of the nitrogen might be 4.0 feet per minute (during 0.5 seconds) and this may be decreased to 1.0 feet per minute during the second portion of the compacting cycle (which latter is maintained during 0.5 seconds).

In the second typical cycle of the densification or compacting operation, the upward velocity of the gas might be 3.8 feet per minute for the first portion of the compacting cycle (over 0.5 seconds); and the upward velocity during the second portion of the cycle may be 0.8 feet per minute (over 0.5 seconds).

It is unexpected that the bed of particles so produced is of practical maximum bulk density. While the bulk density may be asymtotically increased as more than about 50 pulsations (i.e. cycles) are used, it may be found that this number may be sufficient to achieve greater than 80% and up to 98%–99% of maximum theoretically attainable density.

It is particularly surprising that such significant increases in the density of gravity-packed beds can be achieved by the use of such a simple technique which is characterized by (a) minimum power consumption, (b) substantial increase in density (c) fast action, and (d) no deleterious effect upon the particles of the bed.

The so-prepared bed may also be characterized by maximum uniformity with substantially no areas through which channelling or other undesirable flow may occur.

Use of this technique may also make it possible to more effectively pack a catalyst container and to thus permit better utilization (with higher efficiency) of vessels.

DESCRIPTION OF PREFERRED EMBODIMENTS

Practice of the process of this invention may be apparent to those skilled in the art from inspection of the following description of preferred embodiments wherein, as elsewhere in this specification, all parts are parts by weight unless otherwise noted.

EXAMPLE I

In this example which represents a control example using liquid pulsation, 500 g. of cylindrical pellets (each approximately 4.5 mm high and 1.5 mm in diameter) were slowly dropped into a column (50 mm diameter × 275 cm long) through a body of kerosene. The particles came slowly to rest as a bed at the bottom of the column. The static height was 40.7 cm and the calculated initial density of the charge bed was 37.0 pcf (pounds per cubic foot).

In a first portion of a first cycle, kerosene was passed upwardly through the bed for 0.6 seconds at a velocity of 3.14 feet per minute. At the end of 0.6 seconds, the velocity was decreased to 2.09 feet per minute; and this latter velocity was maintained for 0.6 seconds during the second portion of the cycle. The bed was subjected to additional cycles at the rate of 96 cycles per minute. In the first portion of each cycle, the upward velocity (in feet per minute) was as set forth in the first column of the table which follows. The upward velocity (in feet per minute) in the second portion of the cycle was as set forth in the second column of the table. The height of the bed (in cm) at the completion of each cycle as set forth in the third column; and the calculated bulk density (pcf) of the bed on a dry basis at the completion of each cycle was as set forth in the fourth column. The final calculated bulk density, on a dry basis obtained after 32.5 minutes, was 44.1 pcf.

TABLE

| First Velocity | Second Velocity | Bed Height | Bulk Density |
|---|---|---|---|
| 3.14 | 2.09 | 38.9 | 39.6 |
| 3.00 | 1.95 | 38.4 | 40.1 |
| 2.86 | 1.81 | 37.9 | 40.6 |
| 2.72 | 1.74 | 37.4 | 41.2 |
| 2.58 | 1.67 | 37.0 | 41.6 |
| 2.44 | 1.53 | 36.6 | 42.1 |
| 2.30 | 1.46 | 36.3 | 42.4 |
| 2.16 | 1.39 | 36.0 | 42.8 |
| 2.02 | 1.25 | 35.8 | 43.0 |
| 1.88 | 1.18 | 35.5 | 43.4 |
| 1.74 | 1.11 | 35.3 | 43.6 |
| 1.60 | — | 35.2 | 43.8 |
| 1.46 | — | 35.1 | 43.9 |
| 1.32 | — | 35.0 | 44.0 |
| 1.18 | — | 35.0 | 44.0 |
| 1.04 | — | 35.0 | 44.0 |
| 0 | — | 35.0 | 44.0 |

From the above table, it will be apparent that in the control example, the density of the bed increased by 18.9% over the period of 32.5 minutes.

EXAMPLE II

In this control example, the process of Example I was carried out except that there was no liquid in the bed at any time. The particles were admitted dry. The pulsation of the bed was effected by passing nitrogen (at ambient temperature and substantially atmospheric pressure) through the bed at 149 pulsations per minute for 24.5 minutes. The properties of the bed were as set forth in the table which follows. The initial bulk density dry loaded) was 42.8 pcf calculated. The final dry bulk density, after 24.5 minutes was 44.3 pcf.

TABLE

| First Velocity | Second Velocity | Bed Height | Bulk Density |
|---|---|---|---|
| 6.5 | 5.7 | 40.0 | 38.5 |
| 6.25 | 5.5 | 39.5 | 39.0 |
| 6.00 | 5.2 | 39.0 | 39.5 |
| 5.75 | 5.0 | 38.5 | 40.0 |
| 5.50 | 4.7 | 38.0 | 40.5 |
| 5.25 | 4.5 | 37.2 | 41.4 |
| 5.00 | 4.3 | 36.4 | 42.3 |
| 4.75 | 4.1 | 35.8 | 43.0 |
| 4.50 | 4.0 | 35.5 | 43.4 |
| 4.25 | 3.7 | 35.0 | 44.0 |
| 4.00 | 3.5 | 34.8 | 44.3 |
| 3.75 | 3.3 | 34.8 | 44.3 |
| 3.50 | 3.1 | 34.8 | 44.3 |

From the above table, it will be apparent that in this control example, the density of the bed increased (from 42.8 to 44.3 pcf dry) by 3.5% over 24 minutes.

EXAMPLE III

In this experimental example, carried out in accordance with this invention, the catalyst bed was loaded as in Example I. The calculated initial bulk density (dry basis) was 37.3 pcf. The initial bed height was 41.3 cm. Pulsation was carried out in the presence of a static column of kerosene which was 41.3 cm in height. Pulsation was effected by passing nitrogen at ambient temperature and substantially atmospheric pressure into the column at a rate of 90 pulsations per minute for 24 minutes.

The following table sets forth in the first column, the flow rate of the gaseous nitrogen in cubic feet per minute in the first portion of the cycle. In the second column, there is set forth the flow rate of the nitrogen in the second portion of the cycle. The third column shows the height (in cm.) of the bed. The fourth column shows the calculated bulk density (pcf) of the bed on a dry basis. The initial bulk density on a dry basis, of the bed was 37.3 pcf; and the final bulk density on a dry basis, was 44.0 pcf.

TABLE

| First Flowrate | Second Flowrate | Bed Height | Bulk Density |
|---|---|---|---|
| 0.60 | 0.11 | 38.5 | 40.0 |
| 0.55 | 0.10 | 38.0 | 40.5 |
| 0.50 | 0.095 | 38.0 | 40.5 |
| 0.45 | 0.09 | 37.5 | 41.1 |
| 0.40 | 0.09 | 37.3 | 41.3 |
| 0.35 | 0.085 | 37.0 | 41.6 |
| 0.30 | 0.075 | 36.5 | 42.2 |
| 0.25 | 0.065 | 36.0 | 42.8 |
| 0.20 | 0.06 | 35.8 | 43.0 |
| 0.15 | 0.05 | 35.6 | 43.3 |
| 0.10 | — | 35.3 | 43.6 |
| 0.05 | — | 35.2 | 43.8 |
| 0.00 | — | 35.1 | 43.9 |

From the above table, it will be apparent that over 24 minutes, the density of the bed increased from 37.3 to 44.0 pcf — an increase of 18%.

The use of the novel process of this invention, including the use of gas pulsations and a substantially static liquid column, permits attainment of beds of increased density of the same order of magnitude as may be obtained by the use of pulsating liquid systems. It will however be observed that the novel process permits attainment of the desired result in ca 75% as much time (24 minutes vs. 32.5 minutes). It is a particular feature of the process of this invention that densification to maximum density, occurring in substantially shorter time, occurs without the need for pumping any liquid; and in a commercial operation, the capital and operating requirements for pumping liquid are substantially greater than are required in the case of gas pulsation in the presence of a static bed of liquid. As noted in Example II, the use of gas pulsation alone in the absence of liquid yields very little improvement in densification; and this would, in any event, require substantial quantities of pumped gas.

Although this invention has been illustrated by reference to specific embodiments, it will be apparent to those skilled in the art that various changes and modifications may be made which clearly fall within the scope of this invention.

We claim:

1. The method of compacting a charge low density gravity-packed bed of particles which comprises
submerging said charge low density gravity-packed bed of particles in a body of liquid; and
pulsating said submerged charge low density gravity-packed bed of particles with a gas during a pulsation period thereby compacting said charge low density gravity-packed bed and forming a compacted gravity-packed bed of density greater than the density of said charge bed.

2. The method of compacting a charge low density gravity-packed bed of particles as claimed in claim 1 which comprises
submerging said charge low density gravity-packed bed of particles in a static body of liquid;
passing gas upwardly through said bed of particles at an expansion velocity thereby forming an expanded bed of said particles during a first portion of a compacting cycle;
passing gas upwardly through said bed of particles at a velocity less than said expansion velocity during a second portion of a compacting cycle thereby compacting said gravity packed bed; and
repeating said compacting cycle thereby forming a compacted gravity-packed bed of density greater than the density of said charge bed.

3. The method of compacting a charge low density gravity-packed bed of particles as claimed in claim 2 wherein said particles have a greatest dimension of 1-50 cm.

4. The method of compacting a charge low density gravity-packed bed of particles as claimed in claim 2 wherein said liquid is an inert liquid.

5. The method of compacting a charge low density gravity-packed bed of particles as claimed in claim 2 wherein said liquid is a hydrocarbon liquid.

6. The method of compacting a charge low density gravity-packed bed of particles as claimed in claim 2 wherein said gas is an inert gas.

7. The method of compacting a charge low density gravity-packed bed of particles as claimed in claim 2 wherein said gas contains nitrogen.

8. The method of compacting a charge low density gravity-packed bed of particles as claimed in claim 2 wherein said expanded bed has a bulk density of 95%–99% of the bulk density of the charge low density gravity-packed bed of particles.

9. The method of compacting a charge low density gravity-packed bed of particles as claimed in claim 2 wherein the upward velocity of said gas during the first portion of the compacting cycle is 1–100 feet per minute, and the upward velocity during the second portion of the compacting cycle is 0–99 feet per minute.

10. The method of compacting a charge low density gravity-packed bed of particles as claimed in claim 2 wherein the compacting cycle occupies a total time of 0.1–5 seconds.

11. The method of compacting a charge low density gravity-packed bed of particles as claimed in claim 2 wherein the duration of the first portion and the second portion of the compacting cycle are substantially the same.

12. The method of compacting a charge low density gravity-packed bed of particles as claimed in claim 2 wherein the compacting cycle is repeated 10–100 times.

13. The method of compacting a charge low density gravity-packed bed of particles as claimed in claim 2 wherein, in the first portion of the repeated compacting cycles, the upward velocity of gas flow is 1%–10% less than the upward velocity during the first portion of the compacting cycle immediately preceding.

14. The method of compacting a charge low density gravity-packed bed of particles as claimed in claim 2 wherein, in the second portion of the repeated compacting cycles, the upward velocity of gas flow is 1%–20% less than the upward velocity during the second portion of the compacting cycle immediately preceding.

15. The method of compacting a charge low density gravity-packed bed of 1–50 mm particles having a bulk density of 20–100 pcf which comprises submerging said charge low density gravity-packed bed of particles in a substantially static body of inert liquid;

passing inert gas upwardly through said bed of particles at an expansion velocity of 1–100 fpm thereby forming, during a first portion of compacting cycle, an expanded bed having a bulk density of 90%–99% of the bulk density of the charge low density bed;

passing inert gas upwardly through said bed of particles at an expansion velocity of 0–99 fpm thereby forming during a second portion of a compacting cycle, a compacted bed having a bulk density greater than the bulk density of said charge gravity-packed bed of particles; and repeating said compacting cycle thereby forming a compacted gravity-packed bed of bulk density greater than the bulk density of said charge bed.

* * * * *